(12) United States Patent
Baumann

(10) Patent No.: US 6,994,321 B2
(45) Date of Patent: Feb. 7, 2006

(54) RECIPROCATING BALL VALVE

(76) Inventor: Hans D. Baumann, 32 Pine St., Rye, NH (US) 03870

( * ) Notice: Subject to any disclaimer, the term of this patent is extended or adjusted under 35 U.S.C. 154(b) by 0 days.

(21) Appl. No.: 10/871,894

(22) Filed: Jun. 21, 2004

(65) Prior Publication Data

US 2005/0279962 A1 Dec. 22, 2005

(51) Int. Cl.
*F16K 1/00* (2006.01)
(52) U.S. Cl. ............ 251/334; 251/359; 251/364; 251/368
(58) Field of Classification Search ............ 251/334
See application file for complete search history.

(56) References Cited

U.S. PATENT DOCUMENTS

| | | | | |
|---|---|---|---|---|
| 343,451 A | * | 6/1886 | Habernicht | 251/223 |
| 2,973,176 A | * | 2/1961 | Malafouris | 248/228.3 |
| 3,185,438 A | * | 5/1965 | Smirra | 251/334 |
| 3,238,965 A | * | 3/1966 | Masheder | 137/329.05 |
| 3,346,008 A | * | 10/1967 | Scaramucci | 137/516.29 |
| 3,428,293 A | * | 2/1969 | Davies | 251/170 |
| 3,450,385 A | * | 6/1969 | Paptzun | 251/334 |
| 3,472,271 A | * | 10/1969 | Allen | 137/329.05 |
| 4,129,284 A | * | 12/1978 | Scapes et al. | 251/205 |
| 5,259,590 A | * | 11/1993 | Chambers | 251/334 |

* cited by examiner

*Primary Examiner*—J. Casimer Jacyna

(57) ABSTRACT

The device described herein is a valve suitable for the control or shut-off of fluid flow in a piping system. It comprises a valve housing having inlet and outlet ports and a cylindrical bore whose axis is slanted at about 45 degrees in relation to the axis connecting said inlet and outlet ports. A ball or closure member being slindingly arranged within said slanted bore and being capable of making tight contact with a flexible and suitably retained metal seal interspaced between said inlet and outlet ports. Additional means allow for the ball or closure member to connect to a conventional actuating device having linear output motion.

9 Claims, 1 Drawing Sheet

RECIPROCATING BALL VALVE

TECHNICAL FIELD

The control valve described herein makes known an apparatus enabling the control of high-pressure fluids within a piping system capable of closing or modulating flow of gaseous or liquid fluids following the commands of a reciprocating actuating device.

BACKGROUND

Control valves are commonly used to control the fluid passing through a pipe. As known to those skilled in the art, a control valve regulates the rate of fluid flow as the position of the valve plug is changed by an actuator. There are three important features of a control valve, such as a globe valve, that it must contain the fluid without external leakage, that it must be able to withstand the pressure and temperature of the fluid, and that the fluid forces acting on the plug or closure element should not cause instability nor prevent the plug from shutting the valve off.

Quite often control valves have to perform under elevated pressure and temperature conditions. While valves with a single seat shut-off configuration and an unbalanced plug provide good service in these applications, they do require substantial forces that have to be provided by an actuator in order to overcome the effects of high fluid pressure acting on such unbalanced plug surfaces. For example, a one inch valve plug needs more than 800 lbs force to close against 1000 psi fluid pressure.

Such actuator force requirements can be quite expensive and such valves face other problems such as stability of operation. A typical example of such a single seated valve is shown in U.S. Pat. No. 4,474,356.

One typical way of alleviating these problems in prior art is the use of a cage with dual seating surfaces for the plug. My prior inventions, shown in U.S. Pat. Nos. 6,536,472 B2 and 3,805,839, describe such a solution. While capable of performing the required tasks, this is a very expensive solution due to the extra, precision machined, parts and due to the extra heavy bonnet bolting that is required to lock the cage within the valve housing. Finally, these valves have an additional problem of absorbing thermal expansion of the cage, especially if cage and housing have to be made of different materials. Another added expense is posed by the requirements to have the seating surfaces of the plugs lapped against opposing surfaces in the seat rings in order to obtain tight shut-off.

SUMMARY

The object of my invention is a control valve assembly of low cost and compact configuration, requiring neither cage nor seat rings.

A further objective is to provide for substantial reduction of forces created by fluid pressure acting on the valve plug or closure member thereby eliminating the need for larger and expensive actuating devices.

Yet another objective of my invention is to provide a control valve with parts that can be made from similar materials and, utilizing the use of one flexible valve seal, can overcome the adverse effects of thermal expansion on the sealing capabilities of the valve closure member. Finally, by utilizing a finely polished ball which, when compressing a flexible metal seal ring, can provide tight shut-off without resorting to conventional and time consuming lapping procedures. While ball valves are well known in the art, they are utilizing rotary motion for closing or opening of a valve. This in turn requires rotating actuating devices. Such devices are inherently more complicated than simple reciprocating actuators such as a piston and cylinders since rotary actuators require a mechanical interface in order to convert linear into rotary motion.

In accordance with another aspect of my invention, a gradually enlarging flow passage provides a desired flow characteristic by utilizing the elliptical opening of a outlet port co-operating with the spherical portion of a ball or closure member.

DETAILED DESCRIPTION

Figure 1:
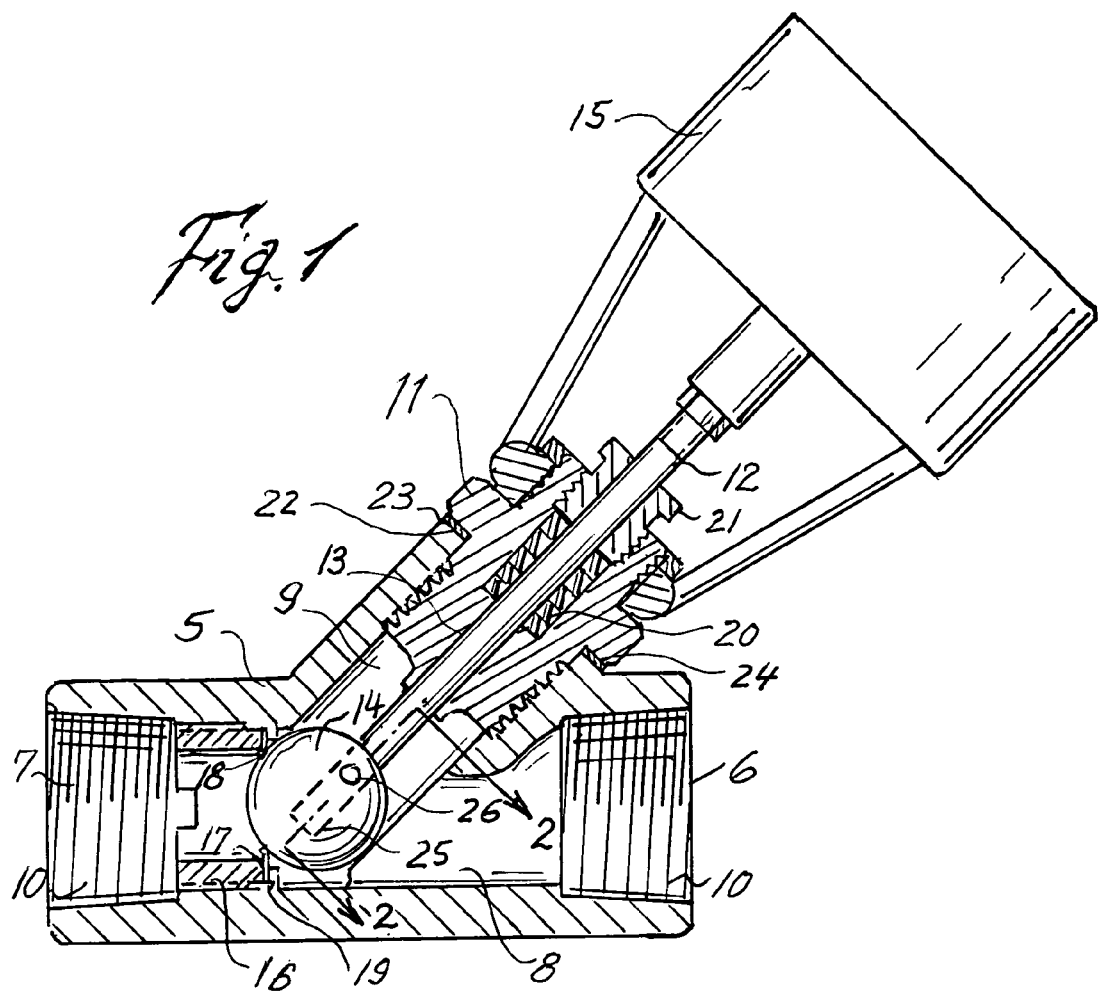
FIG. 1 is a central, cross-sectional view of a preferred embodiment of my invention.

Referring to FIG. 1, my reciprocating ball valve comprises a housing 5 preferably made from stainless steel or bronze, and having a central bore 6, a concentric inlet port 7, and an outlet port 8 whose axis is off-set from that of central bore 6. Housing 5 furthermore has a slanted bore 9 intersecting said central bore 6 at an angle of about 45 degrees from the axis of bore 6. Housing 5 is configured to attach in a suitable manner to fluid conducting pipelines. Suitable pipe threads 10 are shown. However it is understood that the housing 5 may also incorporate a pair of pipeline flanges. A bonnet 11 is threaded into the slanted bore 9 of housing 5. Said bonnet furthermore has a central bore 13 slidingly engaging a valve stem 12 whose lower portion is suitably fastened to a closure member 14, preferably of spherical shape and made of stainless steel or similar hardened and corrosion resisting material, while the upper terminating end of said valve stem attaches to an actuating device 15 of conventional design and which is actuated by pneumatic, hydraulic or electrical means. Said closure member 14 can now be moved up or down while engaged in the closely fitted bore 9, serving as a guide for said closure member.

Inlet port 7 has a stepped and reduced diameter portion which retains a threaded retaining ring 16 having a flattened shoulder 17 which compresses a thin, flexible metal seal 18 against a shoulder 19, being part of housing 5. Seal 18 is preferably made from stainless steel or a nickel alloy. Yet, there are certain chemical applications where seal 18 may be made from a corrosion resistant plastic such as Teflon®. Finally it may be desirable to have first a deformable plastic seal ring for primary contact with the spherical surface of closure member 14 and the followed by a flexible metal ring, for backup. This is especially desirable if bubble-tight shut-off is to be maintained.

Figure 2:
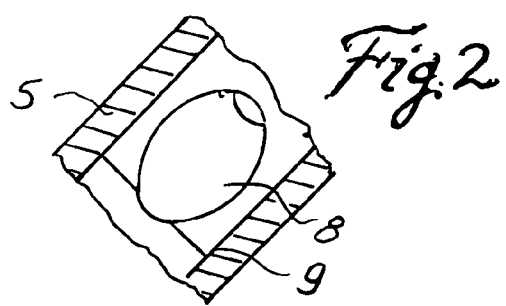
FIG. 2 is an enlarged, partial, cross-sectional view of the outlet portion of the valve housing along the lines 2—2, with the ball removed for clarity.

Bonnet 11 additionally features a hollow indenture 20 and an adjustable packing box 21. As more clearly shown in FIG. 2, slanted bore 9 is intersecting with the off-set bore 8 at an angle of about 45 degrees which then creates an elliptical opening that gets gradually exposed to fluid flow by the upwards movement of closure member 14. This, in turn, results in a nearly perfect linear relationship between fluid flow, at constant differential pressure, and the travel of closure member 14, when motivated by the actuating means 15.

Housing 5 furthermore has a flattened upper terminating portion 22 and a gasket 23 sealingly interspaced between a similar shoulder 24 of bonnet 11.

The inside diameter of the seal ring 18 is typically slightly less than 70% of the diameter of closure member 14. The closure member has a central bore 25 receiving therein the lower portion of stem 12; the latter being secured by a pin 26.

Compared to conventional plug valves, the actuating device in my invention needs substantially less force in order to push closure member 14 against seal ring 18 and the fluid pressure exerted from inlet port 7. There are two reasons for this: first, the bore of the seal ring 18 typically is only about 70% of that of a conventional valve seat ring bore. Therefore, the fluid forces that a plug, or in this case a ball, has to overcome are 51% less. The reason why a 70% seal diameter is sufficient lies in the fact that my Y-style body configuration is much more efficient to conduct fluid flow than the typically complex flow pattern in a globe valve will allow. Secondly, the forces that need to be exerted by valve stem 12 in order to move ball 14 towards seal ring 18 (not counting friction) are only about 70% of what the forces would be, if the ball would have moved axially to seal ring 18, instead of in a 45 degree plane.

The total force saving, compared to a globe valve of equivalent size and flow capacity, is therefore close to 65%, resulting in a substantial actuator cost reduction.

Further cost reductions are achieved by the use of a commercial ball instead of a custom machined valve plug and by the use of a simple, stamped seal ring replacing a complex, machined seat ring.

While the invention has been explained in preferred configurations, the description is not intended to be construed in a limiting sense. Various modifications and combinations will be apparent to those skilled in the art. For example, the bonnet may be attached by suitable bolting instead of being threaded. Also, it is foreseen that the housing may incorporate flanges able to connect to similar flanges of a piping system. It is also foreseen that the inlet and outlet ports may be threaded in order to connect to the piping and that the direction of flow might be reversed from that shown. It is more cost effective to use a commercial metal ball for the closure member, Nevertheless a cylindrical valve plug with a lower spherical contour may be used, or a guide ring could be added above the ball, for certain applications, especially for higher pressure applications. Finally, the angle of slant of bore 9 can be varied from the preferred 45 degrees in order to suit individual size requirements and the flexible metal seal may be replaced or supplemented by a seal ring made from a plastic material.

What is claimed is:

1. A reciprocating ball valve comprising a housing having an inlet port and an outlet port, a first passage connecting said inlet and outlet ports, suitable sealing means located within said first passage and located near said inlet port, said sealing means having an interior diameter and a planary surface that is essentially perpendicular to the axis of said inlet port, a second passage angularly intersecting said first passage at an acute angle and retaining therein a closure member configured to slide linearly without rotating within said second passage and able to selectively approach the planary axis of said sealing means in a slanted direction to interact with said sealing means to stop fluid from flowing between said inlet and outlet ports, said second passage furthermore has a bonnet having a, reduced diameter portion.

2. A reciprocating ball valve as described in claim 1, wherein said sliding closure member has the configuration of a sphere capable of being motivated by a valve stem extending through said reduced diameter portion of said bonnet.

3. A reciprocating ball valve as described in claim 1, wherein said sealing means comprises at least one thin metal ring having an inner and one outer circumference, where the inner circumference is less that 80 percent of the circumference of the closure member, said sealing means being suitably retained and sealed at the intersection between said inlet port and said first passage and being capable of having its inner circumference flexed in order to conform to the shape of said movable closure member when the latter is in contact with said metal ring in order to prevent fluid flow.

4. A reciprocating ball valve as described in claim 1, wherein the second passage has an upper terminating opening within said housing retaining therein a bonnet capable of guiding and sealing said valve stem.

5. A reciprocating ball valve as described in claim 1, wherein said movable closure member incorporates a drilled socket bore originating at a point opposed to the area of the element capable of being in contact with said sealing means and able to receive therein a portion of said valve stem.

6. A reciprocating ball valve as described in claim 5, wherein said valve stem has a lower terminating end that is suitably fastened and retained within said drilled socket bore.

7. A reciprocating ball valve as described in claim 5, wherein the depth of said socket bore extends between $\frac{2}{3}^{rd}$ and $\frac{3}{4}$ of the distance across the movable element.

8. A reciprocating ball valve as described in claim 1, wherein said sealing means further comprises a deformable plastic rings, all suitably fastened and sealingly retained at the intersection of said inlet port and said first passage.

9. A reciprocating ball valve as described in claim 1, wherein said sealing means further comprises a flexible metal rings and one or more deformable plastic rings in series, all suitably fastened and sealingly retained at the intersection of said inlet port and said first passage.

* * * * *